United States Patent
Kraus et al.

(10) Patent No.: US 10,470,374 B2
(45) Date of Patent: Nov. 12, 2019

(54) OVER-CENTER LINKAGE SYSTEM FOR AN AGRICULTURAL ACCUMULATOR

(71) Applicant: Deere & Company, Moline, IL (US)

(72) Inventors: Timothy J. Kraus, Blakesburg, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 307 days.

(21) Appl. No.: 15/252,991

(22) Filed: Aug. 31, 2016

(65) Prior Publication Data

US 2016/0366832 A1    Dec. 22, 2016

Related U.S. Application Data

(63) Continuation-in-part of application No. 14/333,545, filed on Jul. 17, 2014, now Pat. No. 9,578,811.

(51) Int. Cl.
*A01F 15/08* (2006.01)
*A01F 15/07* (2006.01)
*A01D 85/00* (2006.01)

(52) U.S. Cl.
CPC ........ *A01F 15/0883* (2013.01); *A01D 85/005* (2013.01); *A01F 15/0765* (2013.01);
(Continued)

(58) Field of Classification Search
CPC .............. A01F 15/0883; A01F 15/0765; A01F 15/0875; A01D 2085/007; A01D 2085/008; A01D 85/005
See application file for complete search history.

(56) References Cited

U.S. PATENT DOCUMENTS 3,163,302 A    12/1964  Ridgeon
4,310,275 A     1/1982  Hoelscher
(Continued)

FOREIGN PATENT DOCUMENTS

AU        568143     12/1987
AU     2003262343    6/2005
(Continued)

OTHER PUBLICATIONS

European Search Report in foreign counterpart Application No. 15176496.6 dated Dec. 18, 2015 (6 pages).
(Continued)

*Primary Examiner* — Kaitlin S Joerger
(74) *Attorney, Agent, or Firm* — Michael Best & Friedrich LLP

(57) ABSTRACT

An accumulator is coupled to an agricultural baler and is configured to support a crop package exiting the baler. The accumulator includes an accumulator frame coupled to a wheel supported on a surface and a carriage pivotably coupled to the accumulator frame about a first rotational axis for movement between a first position and a second position. The carriage is configured to support the crop package when the carriage is in the first position. The carriage is also configured to discharge the crop package from the accumulator when the carriage is in the second position. The accumulator also includes an over-center linkage system coupled between the accumulator frame and the carriage. The over-center linkage system is configured to lock the carriage in the first position.

23 Claims, 15 Drawing Sheets

(52) U.S. Cl.
CPC .... *A01F 15/0875* (2013.01); *A01D 2085/007* (2013.01); *A01D 2085/008* (2013.01)

(56) References Cited

U.S. PATENT DOCUMENTS

| | | | |
|---|---|---|---|
| 4,362,097 A | 12/1982 | Rogers | |
| 4,402,259 A * | 9/1983 | Viaud | A01F 15/141 100/5 |
| 4,534,691 A | 8/1985 | Miguel | |
| 4,742,880 A | 5/1988 | Schrag et al. | |
| 4,844,675 A | 7/1989 | Strosser et al. | |
| 4,889,047 A * | 12/1989 | Ardueser | A01F 15/0883 100/87 |
| 4,955,774 A | 9/1990 | Van Eecke et al. | |
| 4,961,679 A * | 10/1990 | Van Eecke | A01D 85/005 414/111 |
| 5,131,214 A | 7/1992 | Vermeer | |
| 5,384,436 A | 1/1995 | Pritchard | |
| 5,842,823 A | 12/1998 | Kohnen et al. | |
| 6,053,685 A | 4/2000 | Tomchak | |
| 6,425,235 B1 | 7/2002 | Spaniol et al. | |
| 7,000,533 B2 * | 2/2006 | Derscheid | A01F 15/0883 100/100 |
| 7,064,282 B2 | 6/2006 | Viaud et al. | |
| 7,401,547 B2 | 7/2008 | Degen | |
| 7,640,852 B1 * | 1/2010 | Anstey | A01F 15/0833 100/87 |
| 9,578,811 B2 * | 2/2017 | Kraus | A01F 15/0765 |
| 9,622,420 B2 * | 4/2017 | Kraus | A01F 15/0883 |
| 2002/0029542 A1 | 3/2002 | Davis et al. | |
| 2003/0235485 A1 | 12/2003 | Bergen et al. | |
| 2004/0089483 A1 | 5/2004 | Viaud et al. | |
| 2004/0103632 A1 | 6/2004 | Derscheid et al. | |
| 2006/0086263 A1 | 4/2006 | Degen | |
| 2013/0074709 A1 * | 3/2013 | Thompson | A01F 15/0883 100/7 |
| 2013/0116895 A1 | 5/2013 | Smith et al. | |
| 2013/0304614 A1 | 11/2013 | Christie et al. | |
| 2014/0003888 A1 | 1/2014 | Dux et al. | |
| 2014/0174303 A1 | 6/2014 | Posselius et al. | |
| 2014/0208708 A1 | 7/2014 | Waechter et al. | |
| 2014/0215983 A1 | 8/2014 | Pollklas | |
| 2015/0216125 A1 | 8/2015 | Olander et al. | |
| 2016/0014966 A1 * | 1/2016 | Kraus | A01F 15/0883 56/341 |
| 2016/0014967 A1 * | 1/2016 | Kraus | A01D 85/005 414/812 |
| 2016/0014968 A1 * | 1/2016 | Kraus | A01D 85/005 414/812 |
| 2016/0014969 A1 | 1/2016 | Kraus et al. | |
| 2016/0014971 A1 | 1/2016 | Kraus | |

FOREIGN PATENT DOCUMENTS

| | | |
|---|---|---|
| CA | 2709397 | 5/2000 |
| DE | 2851117 | 6/1980 |
| EP | 983720 | 3/2000 |
| EP | 2923560 | 9/2015 |
| FR | 2679410 | 1/1993 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| RU | 2262829 C1 | 10/2005 |
| RU | 134395 U1 | 11/2013 |
| SU | 181590 A1 | 9/1985 |
| WO | 2014031355 | 2/2014 |

OTHER PUBLICATIONS

Russian Search Report issued in counterpart application No. 2015127035 dated Mar. 27, 2019. (2 pages).

* cited by examiner

OVER-CENTER LINKAGE SYSTEM FOR AN AGRICULTURAL ACCUMULATOR

CROSS-REFERENCE TO RELATED APPLICATIONS

The present application is a continuation-in-part to U.S. application Ser. No. 14/333,545, filed on Jul. 17, 2014, the contents of which are incorporated herein by reference.

BACKGROUND

The present disclosure generally relates to crop harvesting systems. More particularly, this disclosure relates to crop harvesting systems employing a harvester and an accumulator for accumulating crop.

SUMMARY

In one aspect, an accumulator is coupled to an agricultural baler and is configured to support a crop package exiting the baler. The accumulator includes an accumulator frame coupled to a wheel supported on a surface and a carriage pivotably coupled to the accumulator frame about a first rotational axis for movement in a first rotational direction from a first position to a second position. The carriage is configured to support the crop package when the carriage is in the first position. The carriage is also configured to discharge the crop package from the accumulator when the carriage is in the second position. The accumulator also includes an over-center linkage system coupled between the accumulator frame and the carriage and having a pivot member configured to rotate in a second rotational direction opposite the first rotational direction to move the carriage in the first rotational direction. The over-center linkage system is configured to inhibit rotation of the carriage from the first position to the second position until the over-center linkage system is actuated to move the pivot member in the second rotational direction.

In another aspect, an accumulator is coupled to an agricultural baler and is configured to support a crop package exiting the baler. The accumulator includes an accumulator frame coupled to a wheel supported on a surface and a carriage pivotably coupled to the accumulator frame about a first rotational axis for movement between a first position and a second position. The carriage is configured to support the crop package when the carriage is in the first position. The carriage is also configured to discharge the crop package from the accumulator when the carriage is in the second position. The accumulator also includes an over-center linkage system coupled between the accumulator frame and the carriage. The over-center linkage system is configured to lock the carriage in the first position.

In yet another aspect, an accumulator is coupled to an agricultural baler and is configured to support a crop package exiting the baler. The accumulator includes an accumulator frame coupled to a wheel supported on a surface and a carriage pivotably coupled to the accumulator frame about a first rotational axis for movement between a first position and a second position. The carriage is configured to support the crop package when the carriage is in the first position. The carriage is also configured to discharge the crop package from the accumulator when the carriage is in the second position. The accumulator also includes a linkage system having a second rotational axis. The linkage system includes an actuator coupled between the accumulator frame and the second rotational axis and a linkage member coupled between the second rotational axis and the carriage. The actuator is operable to move the linkage member about the second rotational axis to move the carriage about the first rotational axis.

In yet another aspect, an accumulator is coupled to an agricultural baler and moveable along a surface at a first linear velocity. The accumulator is configured to support a crop package exiting the baler. The accumulator includes an accumulator frame coupled to a wheel supported on a surface and a carriage pivotably coupled to the accumulator frame about a first rotational axis for movement between a first position and a second position. The carriage is configured to support the crop package when the carriage is in the first position. The carriage is configured to discharge the crop package from the accumulator when the carriage is in the second position. The accumulator also includes an over-center linkage system coupled between the accumulator frame and the carriage. The over-center linkage system is configured to move the carriage between the first and second positions and to control an angular velocity of the carriage as the carriage moves from the first position to the second position.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
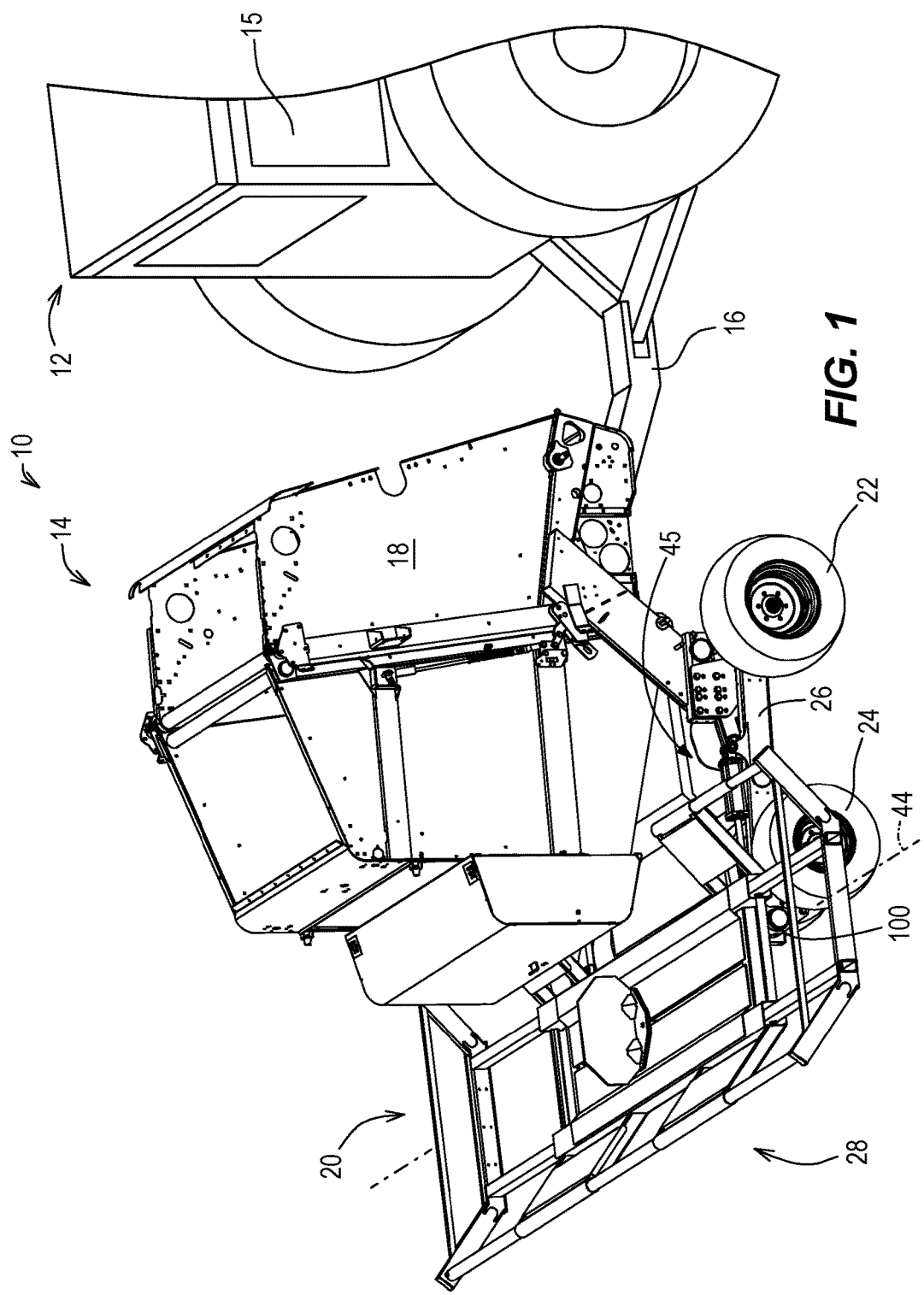
FIG. 1 is a perspective view of a crop harvesting system including one embodiment of a system for controlling the speed of harvested crop as it is discharged.
Figure 2:
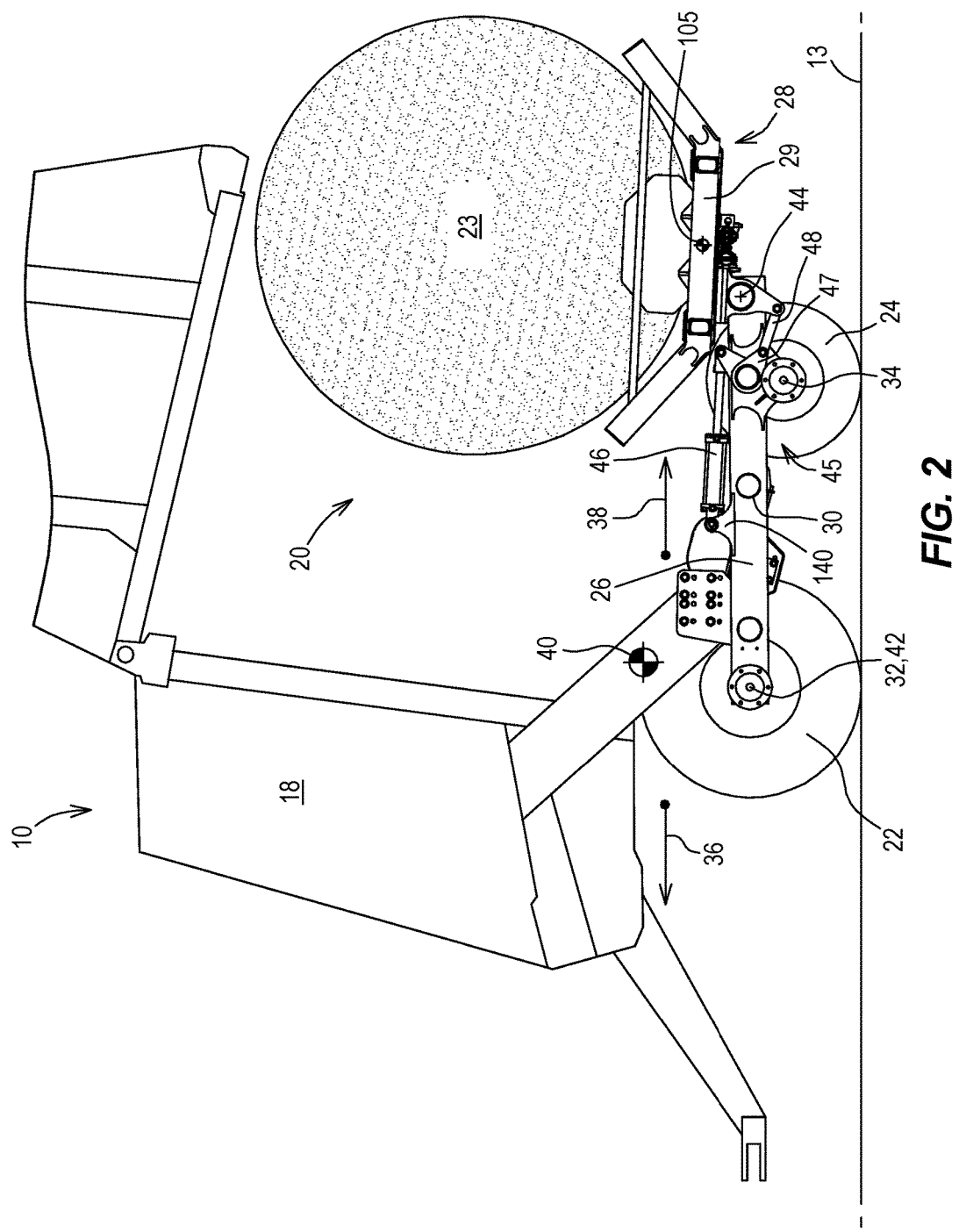
FIG. 2 is a side view of the crop harvesting system of FIG. 1 including a baler, an accumulator, and a crop package supported on the accumulator.

FIG. 1 illustrates a baling system 10 comprising a tractor 12 and a baler 14. The tractor 12 includes an operator station or cab 15. The baler 14 is connected to the tractor 12 via a hitch 16, thereby providing towing for the movement of the baler 14. The baler 14 includes an agricultural baler assembly 18, a crop accumulator 20, and at least one first ground engaging support 22 (e.g., a pair of first wheels). With reference to FIG. 2, the baler assembly 18 receives crop material as the baling system 10 traverses an agricultural surface or field 13 and forms a bale or crop package 23 from the crop material.

With continued reference to FIG. 2, the crop accumulator 20 also includes at least one second ground engaging support 24 (e.g., a pair of second wheel), structural members or an accumulator frame 26, and a discharge assembly 28. The discharge assembly 28 is shown as a bale carriage 29. The ground engaging supports 22, 24 may be in the form of wheels and axles as illustrated or in some other form (e.g., a track system). The structural members 26 may be in the form of a beam and may be referred to as a walking beam construct. The baler assembly 18 is connected to the accumulator frame 26 at baler connections 30, thereby transferring most of the weight of the baler assembly 18 to the accumulator frame 26. The accumulator frame 26 is pivotally coupled to the ground engaging support 22 about a pivotal axis 32, and the ground engaging support 24 is rotationally coupled to the accumulator frame 26 about a rotational axis 34. The baler connection 30 is shown located between the pivotal axis 32 and the rotational axis 34. More specifically, the baler connection 30 is located in a fore direction 36 from rotational axis 34 and generally in an aft direction 38 of pivotal axis 32. Alternatively, the baler connection 30 may be in line with, generally in line with, or proximate the pivotal axis 32. The baler connection 30 is a pivoting connection although it is also contemplated that baler connection 30 could also be a non-pivoting connection.

The baler 14 is supported primarily by way of the ground engaging supports 22, 24 with the weight of the baler assembly 18 being transferred to the accumulator frame 26 by way of the baler connection 30. In the present embodiment, a center of gravity ("CG") 40 of the baler assembly 18 is generally in line with the pivotal axis 32, and the CG 40 will shift as the amount of crop material increases in the baler assembly 18 and as the baler assembly 18 discharges the bale 23 onto the bale carriage 29. The accumulator frame 26 functions as walking beams with the weight of the baler assembly 18 used to counteract the weight of the bale(s) 23 on the bale carriage 29. The CG 40 is generally fore of the baler connection 30. This arrangement effectively eliminates an upward force being transmitted through the baler connection 30, which thereby eliminates the potential upward force that would occur at the hitch 16 as bales 23 are formed and discharged to the bale carriage 29 and ultimately to the ground if the baler connection 30 were not there.

Although the baler connection 30 is shown apart from the pivotal axis 32, it is also contemplated that the baler connection 30 may be proximate to the pivotal axis 32. Further, the pivotal axis 32 is shown as being coaxial with a rotational axis 42 of the ground engaging support 22. However, it is also contemplated that the pivotal axis 32 may be generally proximate to the rotational axis 42, but not coaxially located.

Figure 2A:
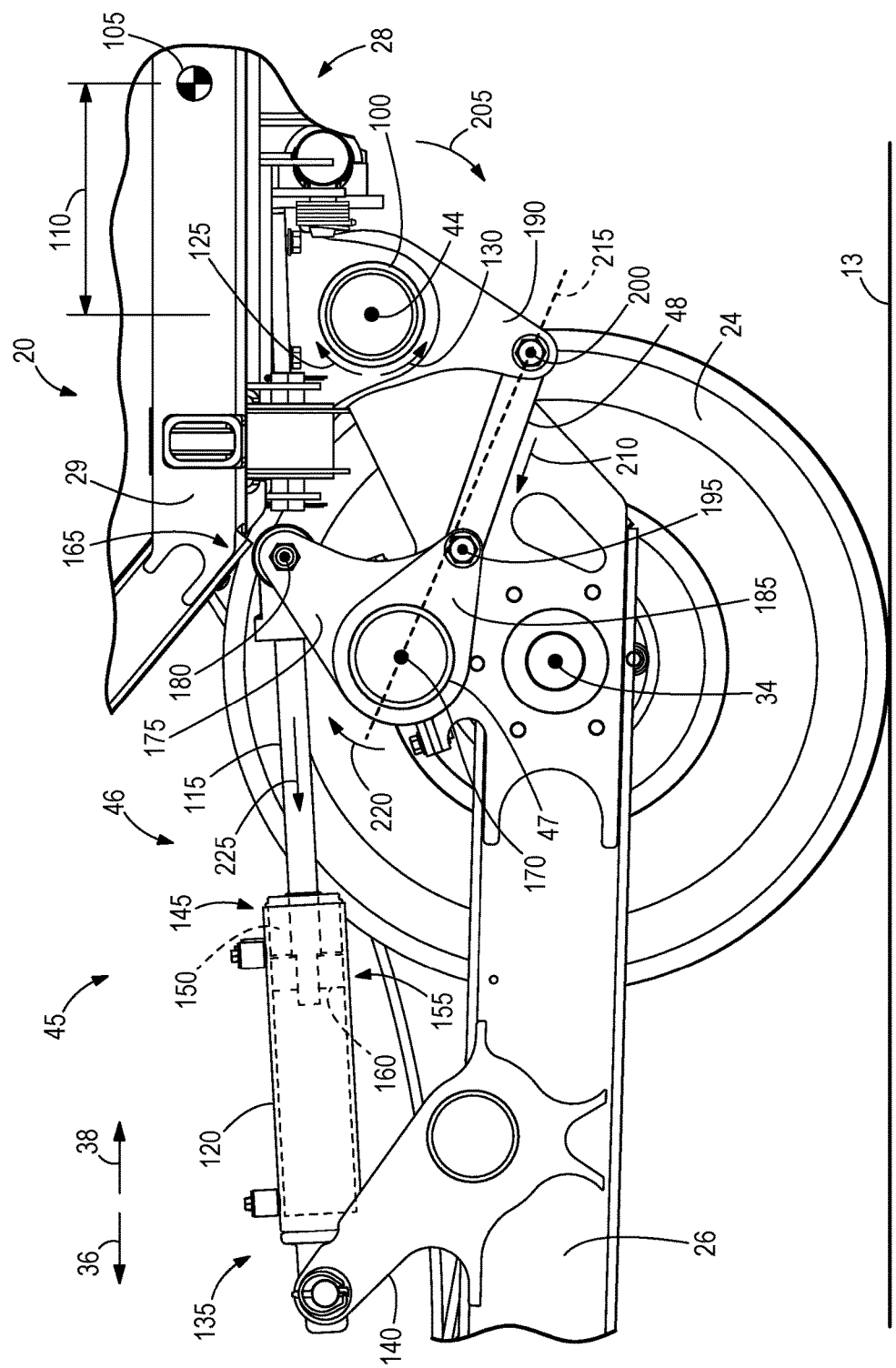
FIG. 2A is a detailed view of a portion of the accumulator of FIG. 2 in a first position including an over-center linkage system in a locked condition.
Figure 12:
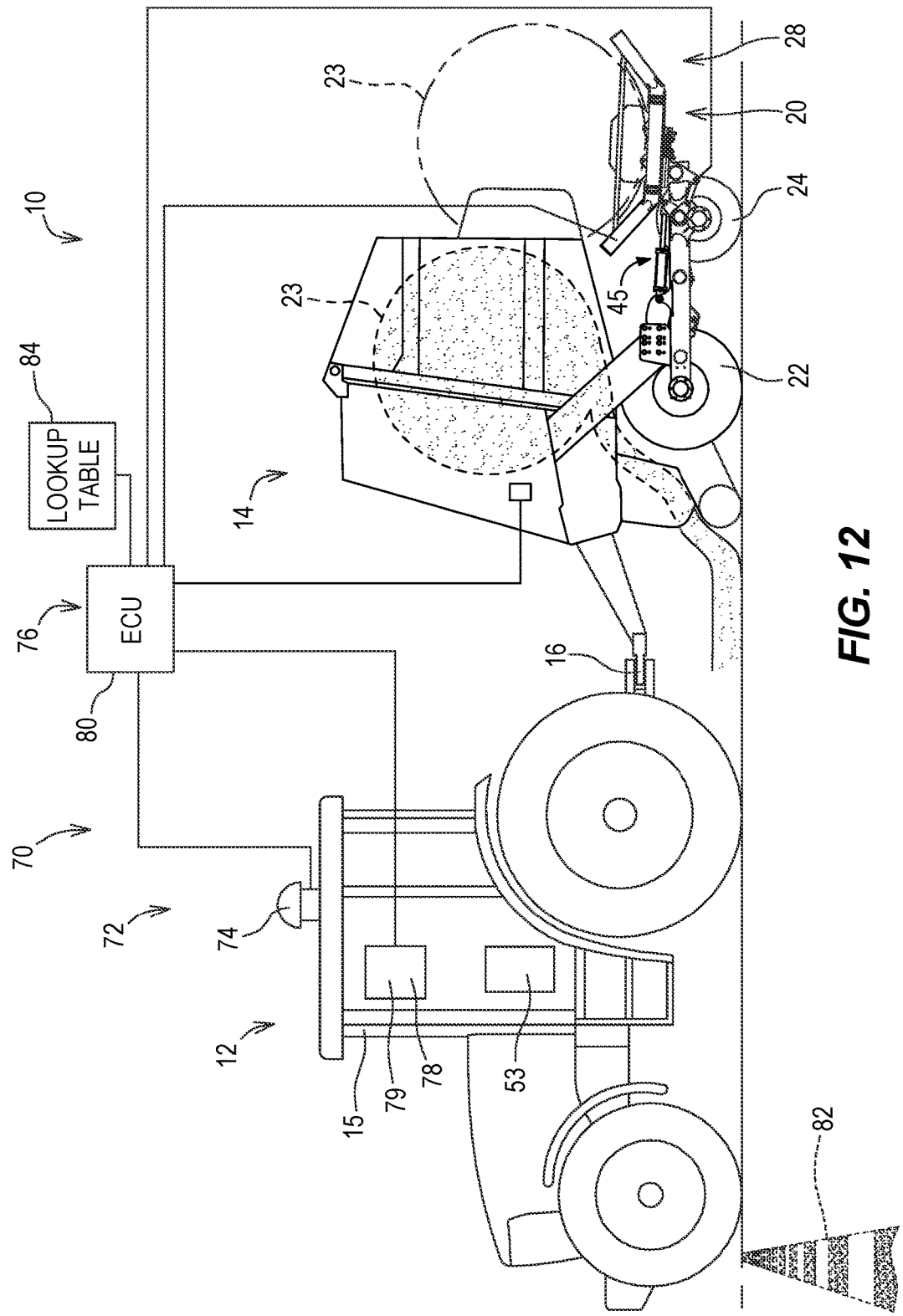
FIG. 12 is a partial schematic side view of the crop harvesting system of FIG. 1.
Figure 13:
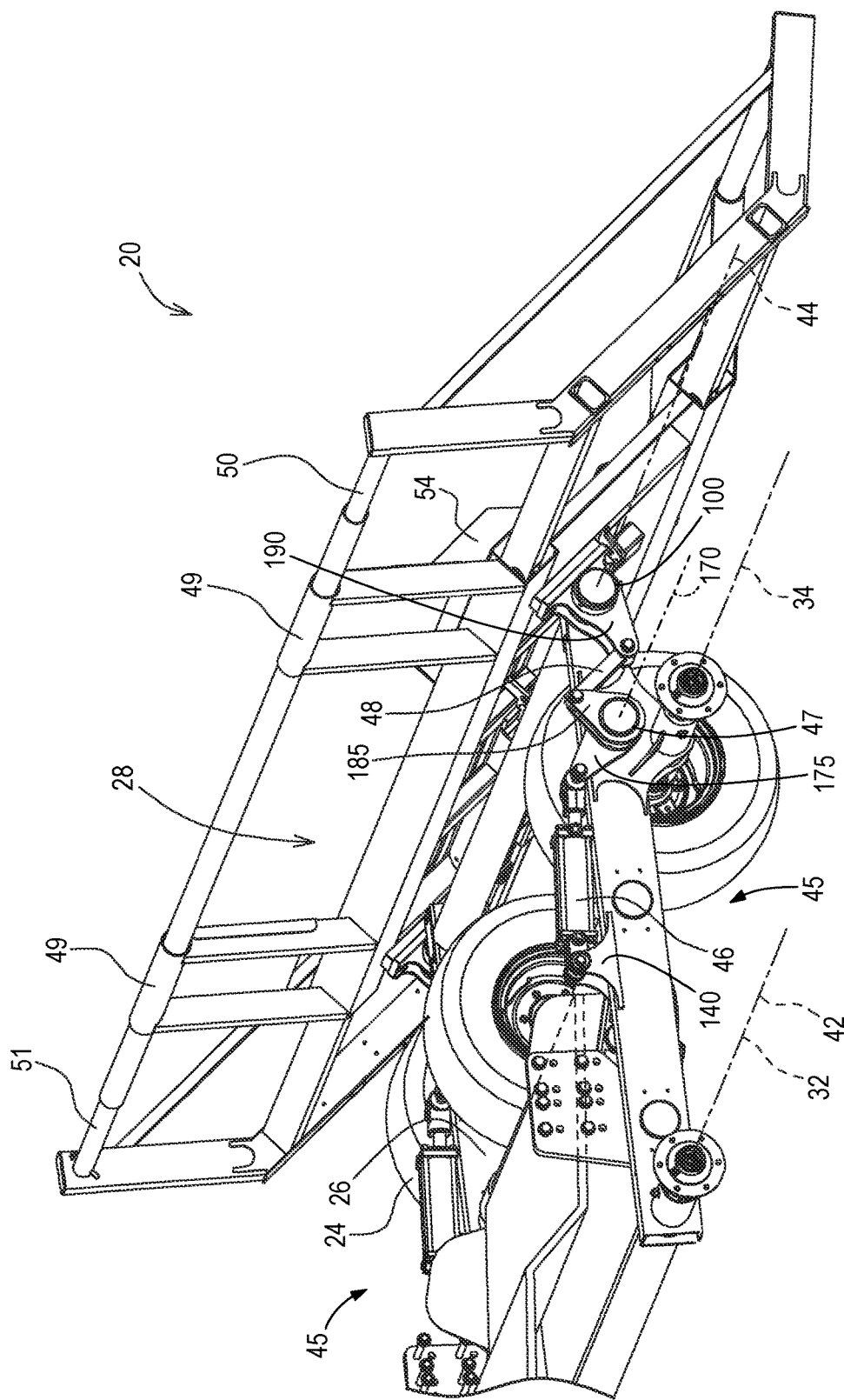
FIG. 13 is a partial perspective view of the accumulator of FIG. 2 in a second position.
Figure 13A:
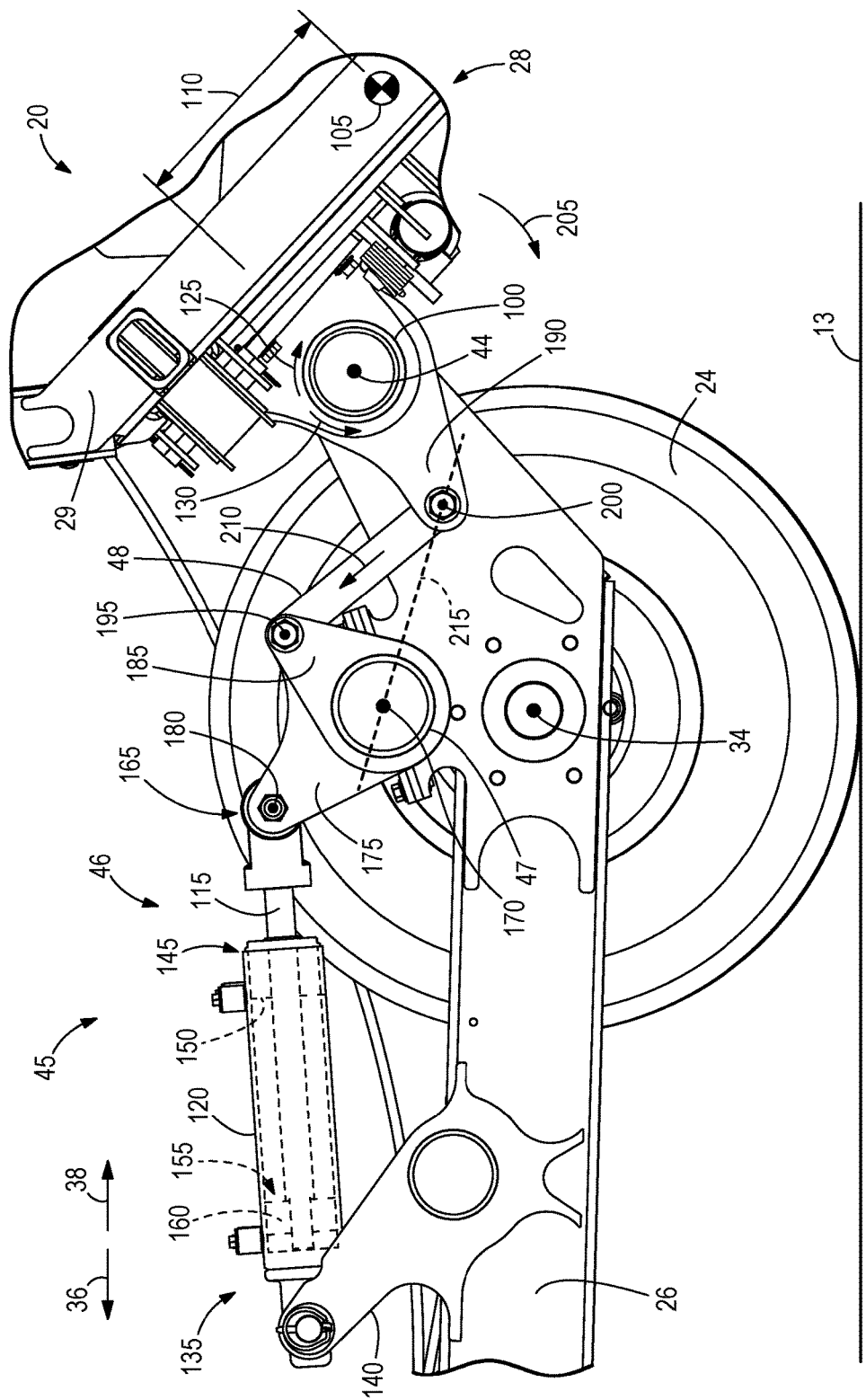
FIG. 13A is a detailed view of a portion of the accumulator of FIG. 13 including the over-center linkage system in an unlocked condition.

With reference to FIGS. 2 and 2A, the bale carriage 29 is pivotally connected to the accumulator frame 26 about an axle 100 (defining a carriage axis 44) by linkage systems 45 (e.g., movement devices, further described below) to thereby allow the bale carriage 29 to pivot between a first or supporting position (FIGS. 2 and 2A) and a second or dumping position (FIGS. 13 and 13A). In addition, the bale carriage 29 is offset (e.g., not centered) about the axle 100 so that a center of gravity 105 of the bale carriage 29 is spaced from the carriage axis 44 at a distance 110 (FIG. 2A). In other embodiments, the center of gravity 105 may vertically align (e.g., be centered) with the carriage axis 44, or may even be located forward of the carriage axis 44 with respect to a forward direction of movement of the crop accumulator 20 (i.e., the fore direction 36). In the illustrated embodiment, two linkage systems 45 are provided, one coupled on each side of the crop accumulator 20 between the bale carriage 29 and the accumulator frame 26. Both linkage systems 45 are similarly constructed, so only one linkage system 45 will be described in detail below. The linkage system 45 may be controlled by a manually adjustable control 53 (FIG. 12) (e.g., hydraulic control valve) or may be controlled electrically or pneumatically. In other embodiments, only one linkage system 45 may be coupled between the bale carriage 29 and the accumulator frame 26. In further embodiments, more than two linkage systems 45 may be coupled between the bale carriage 29 and the accumulator frame 26.

The illustrated linkage system 45 includes an actuator 46 having an actuator arm or rod 115 slidably coupled to (e.g., translates relative to) a cylinder body 120. The actuator 46 is configured to enable pivotable movement of the bale carriage 29 about the carriage axis 44 in a first rotational direction 125 and a second rotational direction 130. In the illustrated embodiment, the actuator 46 is a hydraulic cylinder that is operable by hydraulic power supplied by the tractor 12. In other embodiments, the actuator 46 may be a pneumatic or an electric actuator. Any such actuator can take forms other than a piston and cylinder arrangement, such as a rack and pinion assembly, a worm and worm gear assembly, and the like. A first end 135 of the body 120 is coupled to the accumulator frame 26 by a bracket 140, and a second end 145 of the body 120 includes a first stop 150. The illustrated actuator arm 115 includes a first end 155 having a plate or block 160 that is slidably received within the body 120 between the first and second ends 135, 145. In the illustrated embodiment, the actuator 46 is in a fully extended position (FIG. 2A) when the block 160 abuts, is adjacent, or is otherwise blocked from further extension movement by the first stop 150, and the actuator 46 is in a retracted position (FIG. 13A) when the block 160 abuts, is adjacent, or is otherwise blocked from further retraction with respect to the first end 135 of the body 120. The illustrated actuator arm 115 also includes a second end 165 that is coupled to a pivot member 47 (e.g., a bell crank), which is pivotably coupled to the accumulator frame 26 about a pivot member axis 170, with the pivot member axis 170 positioned between the carriage axis 44 and the first end 135 of the actuator 46. In particular, the pivot member 47 includes a first flange 175 coupled to the second end 165 of the actuator arm 115 at a first connection point 180 and a second flange 185 angularly spaced from the first flange 175 about the pivot member axis 170. The illustrated linkage system 45 also includes a connector link or linkage member 48 coupled between the second flange 185 and a third flange 190, which extends from the axle 100. Specifically, the linkage member 48 is coupled to the second flange 185 at a second connection point 195, and the linkage member 48 is coupled to the third flange 190 at a third connection point 200. The illustrated third flange 190 is fixed to the axle 100 so that the bale carriage 29 and the third flange 190 co-rotate about the carriage axis 44.

The linkage system 45 also defines an over-center locking system to lock the bale carriage 29 in the supporting position (FIG. 2A) with the linkage system 45 substantially located in the fore direction 36 relative to the carriage axis 44. In other embodiments, the linkage system 45 may be located substantially in the aft direction 38 relative to the carriage axis 44. Because the center of gravity 105 of the bale carriage 29 is spaced from the carriage axis 44 at the distance 110, a moment force 205 about the carriage axis 44 is created in the first rotational direction 125. The moment force 205 is at least partially transferred through the third flange 190 to produce an axial or compression force 210 on the linkage member 48. In the illustrated embodiment, the pivot member 47, the linkage member 48, and the third flange 190 are configured such that the second connection point 195 is located below an over-center action line 215 when the actuator 46 is in the fully extended position. The illustrated action line 215 intersects the pivot member axis 170 and the third connection point 200. In other words, the action line 215 is positioned between the first connection point 180 and the second connection point 195 with the second connection point 195 positioned between the action line 215 and the surface 13. In other embodiments, the second connection point 195 may be located above the action line 215 with the first connection point 180 located between the action line 215 and the surface 13. In further embodiments, the action line 215 may intersect the pivot member axis 170, the second connection point 195, and the third connection point 200. In the illustrated embodiment, once the actuator 46 is in the fully extended position, the over-center linkage system 45 is in a locked condition. In other embodiments, the over-center linkage system 45 may be in the locked condition when the actuator 46 is positioned in the retracted position. The locked condition of the over-center linkage system 45 is maintained regardless of how the accumulator 20 moves across the surface 13. For example, the surface 13 may be angled upwardly or downwardly and/or the accumulator 20 may be increasing in acceleration or decreasing in acceleration without the linkage system 45 inadvertently moving out of the locked condition.

With continued reference to FIG. 2A, the linkage member 48 is oriented at an angle relative to the action line 215 when the over-center linkage system 45 is in the locked condition. Stated another way, a direction of the axial force 210 is oriented below the action line 215. As such, the axial force 210 pushes against the pivot member 47 in a clockwise direction as viewed from FIG. 2A (rotates in the same direction as the first rotational direction 125) (e.g., the pivot member 47 experiences a torsional force 220 from at least a portion of the axial force 210). However, when the over-center linkage system 45 is in the locked condition, the actuator 46 is in the fully extended position providing engagement between the stop 150 and block 160 to inhibit the actuator arm 115 from extending further from the body 120. In other words, the torsional force 220 is inhibited from rotating the pivot member 47 in the same direction as the first rotational direction 125 by an opposing actuator force 225 provided by the engagement between the stop 150 and block 160. As such, the pivot member 47 is inhibited from rotating in the same direction as the first rotational direction 125 when the over-center linkage system 45 is in the locked condition.

Accordingly, the over-center linkage system 45 uses the center of gravity 105 of the bale carriage 29 to lock the bale carriage 29 in the supporting position. Moreover, once a crop package 23 is supported on the bale carriage 29, the over-center linkage system 45 also uses the weight of the crop package 23, which generally vertically aligns with the center of gravity 105, to lock the bale carriage 29 in the supporting position (FIG. 2). Thus, the bale carriage 29 is mechanically locked in the supporting position (FIG. 2) while supporting a crop package 23. Because the bale carriage 29 remains in the locked supporting position by the weight of the bale carriage 29 and the crop packages 23 supported on the bale carriage 29, a feature is provided that inhibits the bale carriage 29 from moving into the dumping position (FIGS. 13 and 13A) and having the crop packages 23 inadvertently roll off of the bale carriage 29 if a failure occurs (e.g., hydraulic failure).

Figure 3:
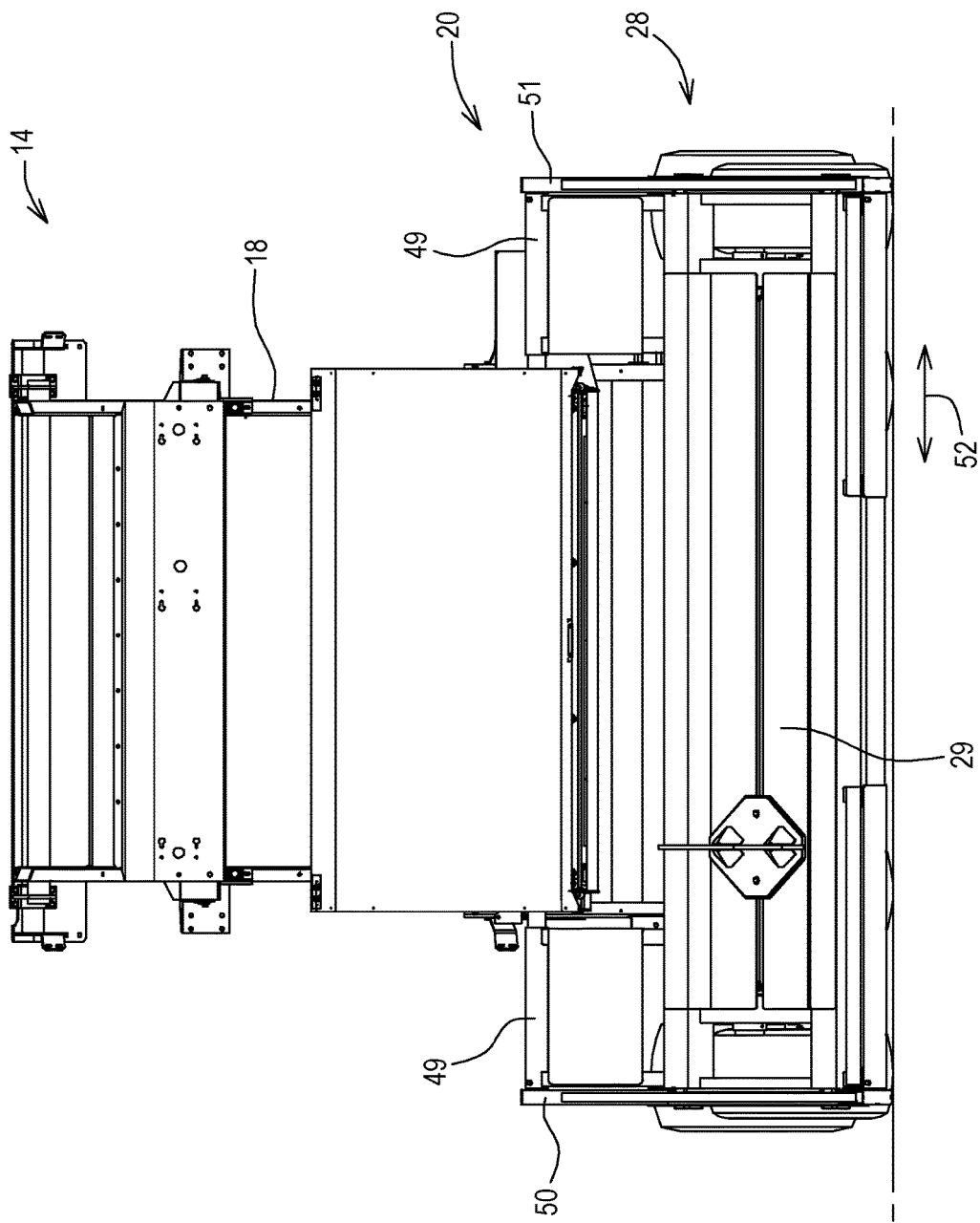
FIG. 3 is a rear view of the crop harvesting system of FIG. 1.

Referring to FIG. 3, there is shown a rear view of the baler 14, with the bale carriage 29 in a retracted mode ready for travel down a road, or prior to any bales 23 (FIG. 2) being formed and placed on the bale carriage 29. The bale carriage 29 has a fixed section 49 and two extending sections 50, 51, which extend/retract along a direction 52. The direction 52 is substantially normal to the fore direction 36 (FIG. 2), with the fore direction 36 being a travel direction for the baler 14. The extending sections 50, 51 are shown retracted within portions of the fixed section 49. Although it is also contemplated that parts of the extending sections 50, 51 could also envelop portions of the fixed section 49, when in the retracted state. The interaction of the extending sections 50, 51 with the fixed section 49 is such that a telescoping relationship exists as well as a nesting relationship as can be seen in subsequent figures.

Figure 4:
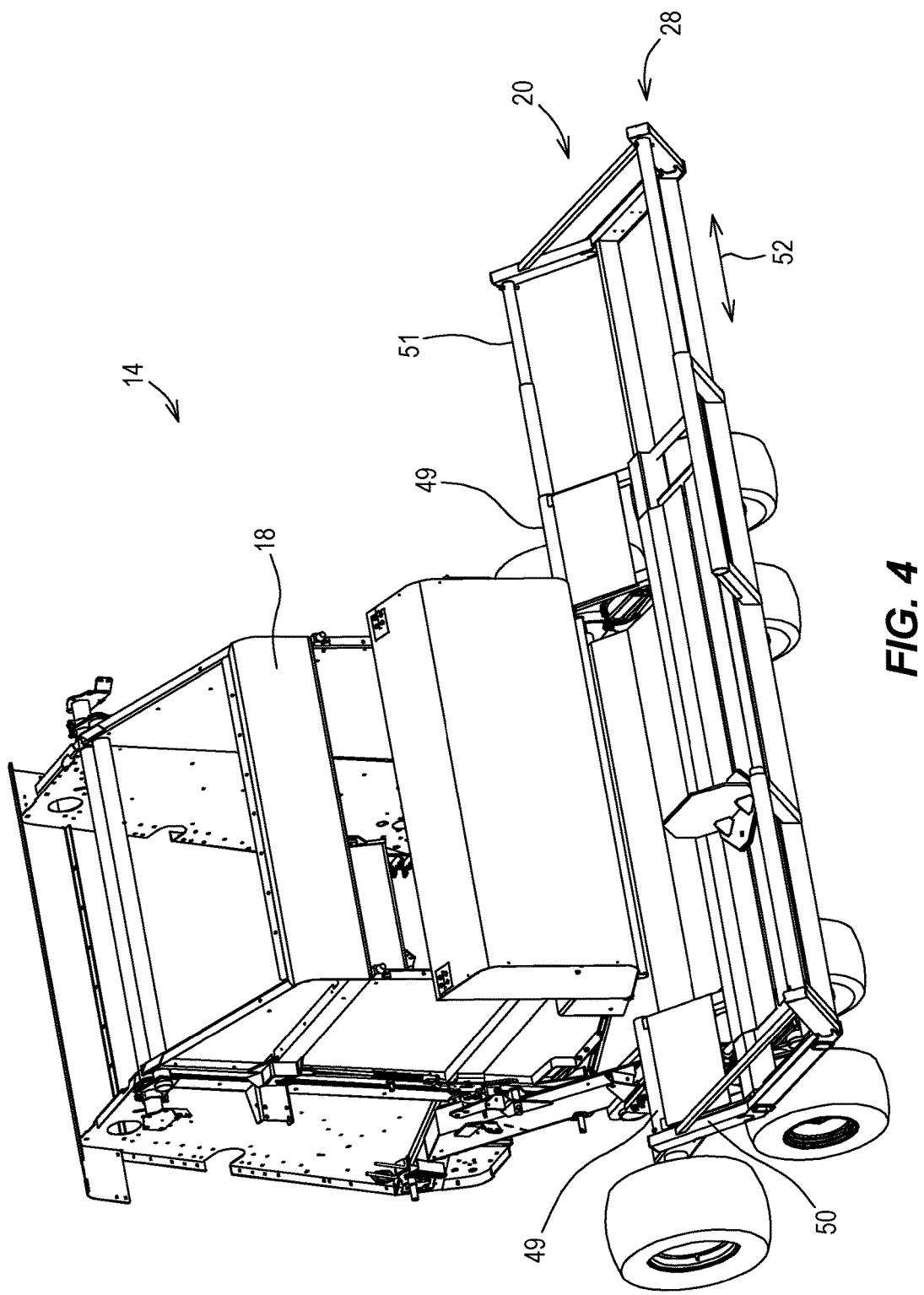
FIG. 4 is a rear perspective view of the crop harvesting system of FIG. 1 showing an extending section in an extended mode.

With reference to FIG. 4, there is shown a view of the baler 14 with the extending section 51 in an extended mode and the extending section 50 in a retracted mode. Although the fixed section 49 is referred to as fixed, it nonetheless pivots along with the extending sections 50, 51 with the rest of the bale carriage 29 about the carriage axis 44 (FIG. 2).

Figure 5:
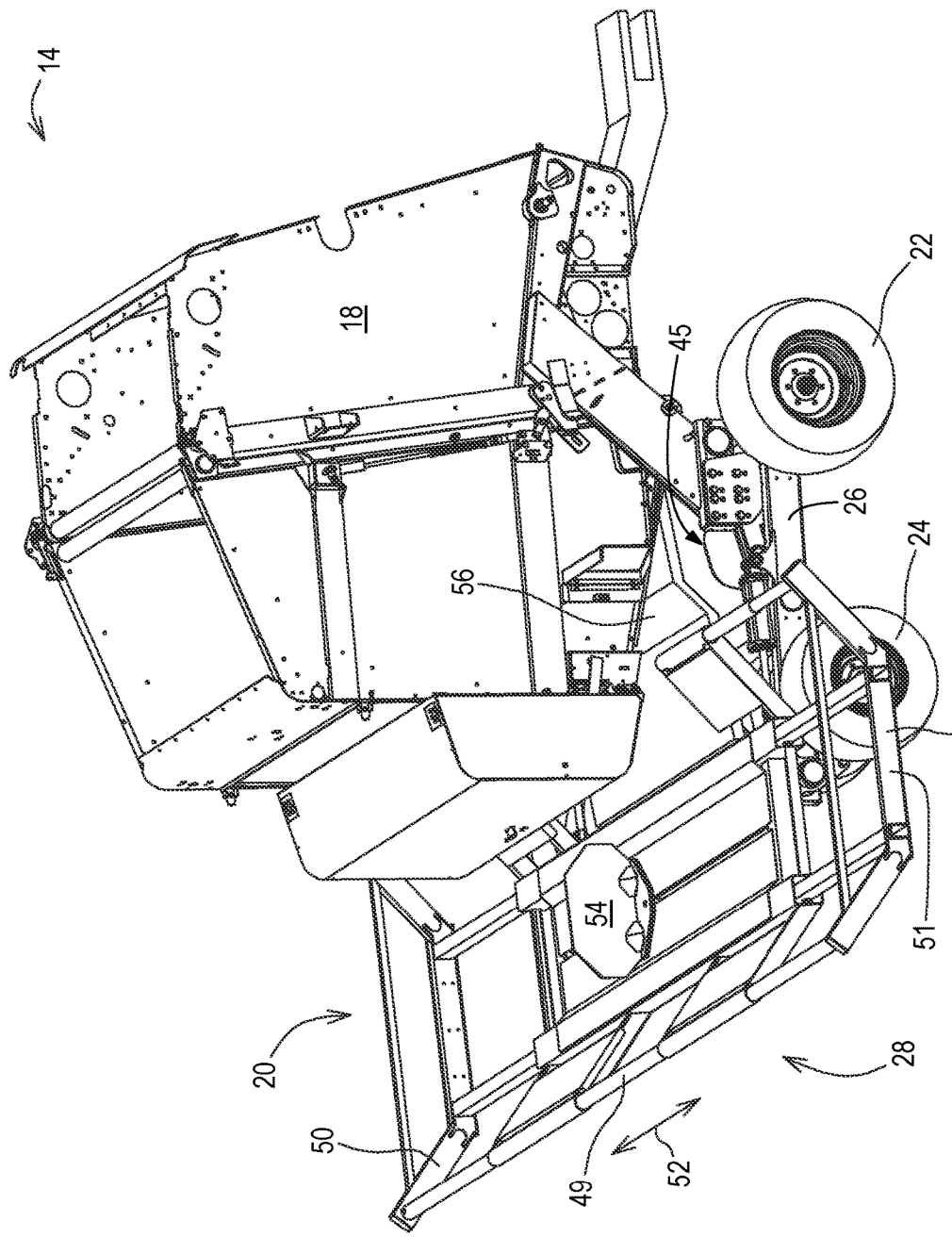
FIG. 5 is a perspective view of the crop harvesting system of FIG. 1.

Referring to FIG. 5, there is shown a sliding assembly 54 and a platform 56. The sliding assembly 54 is configured to slide a bale 23 along the direction 52. The sliding assembly 54 is operable to move a bale 23 in the appropriate direction so that the bale 23 ends up substantially supported on either extending section 50, 51. The control of the sliding assembly 54 is coordinated with the movement of a bale 23 onto the bale carriage 29 and operates to position a bale 23 on each of the extending sections 50, 51.

Figure 6:
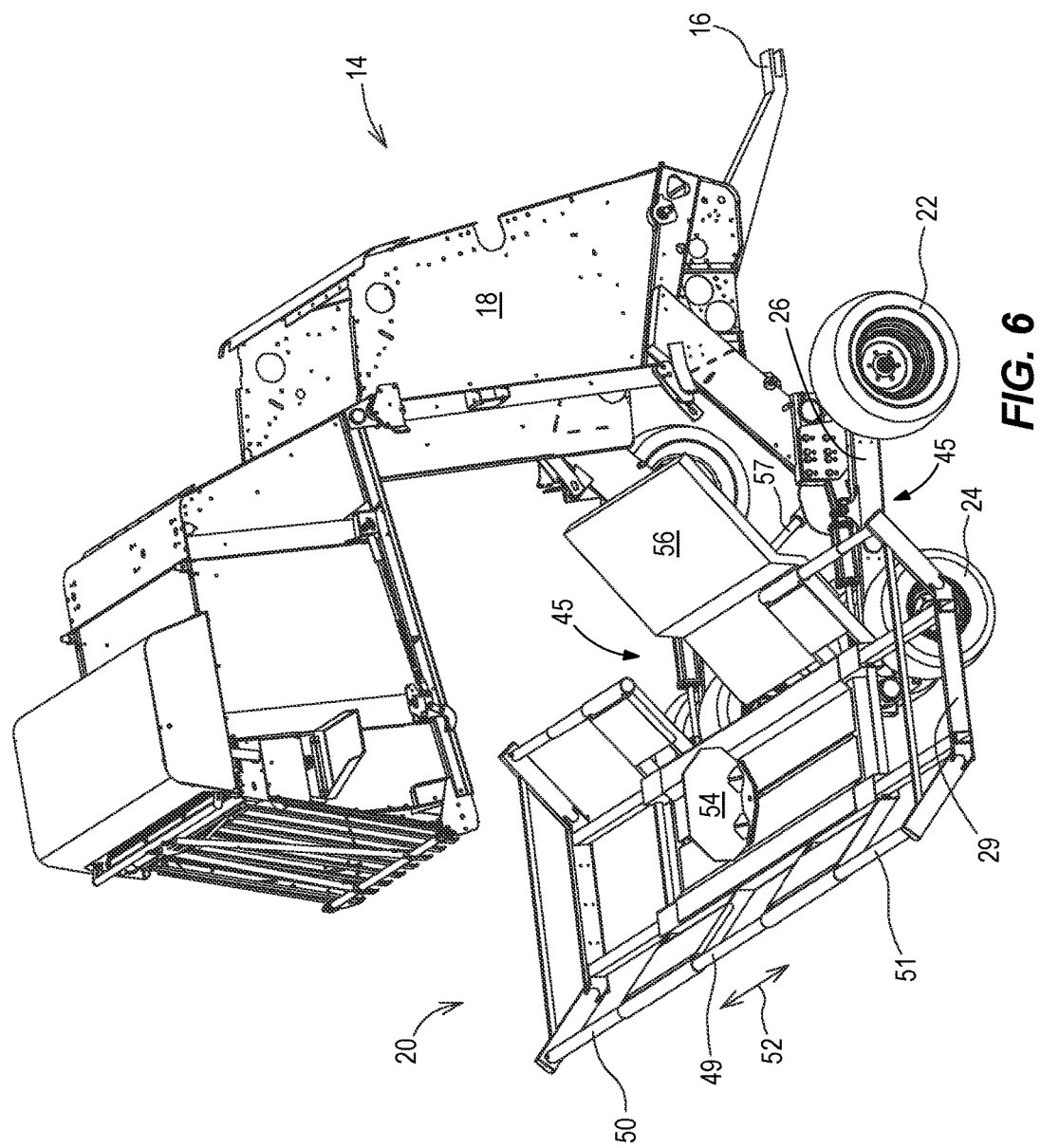
FIG. 6 is another perspective view of the crop harvesting system of FIG. 1 showing the baler in an open position without a bale.

The platform 56 is situated as being in a substantially flat orientation and is in position for a bale 23 to be dropped thereon by the baler assembly 18. The platform 56 is tiltable via a movement device 57 (FIG. 6). The movement device 57 is an actuator shown as a hydraulic cylinder. Other movement devices 57 are contemplated by this disclosure (e.g., electronic actuator). The platform 56, which can also be thought of as a tilting table, receives a bale 23 and when the back portion of baler assembly 18 opens, the platform 56 tilts and/or lifts the bale 23 in a generally aft direction 38 (FIG. 2) to move the bale 23 onto the bale carriage 29, as can be seen in some of the subsequent figures.

With reference to FIG. 6, there is shown another view of the sliding assembly 54 and the platform 56. The platform 56 is shown tilted in a rearward direction and is configured to position a bale 23 so that it can be slid in a direction 52 without the side of the bale 23 getting caught on the fore part of the bale carriage 29. This is accomplished by positioning the platform 56 such that it pushes the bale 23 far enough back so that as the sliding assembly 54 moves the bale 23. The bale 23 does not initially contact the fore part of the bale carriage 29. This may be considered a type of shingling maneuver so that the bale 23 proceeds along the bale carriage 29 without undue restriction.

Figure 7:
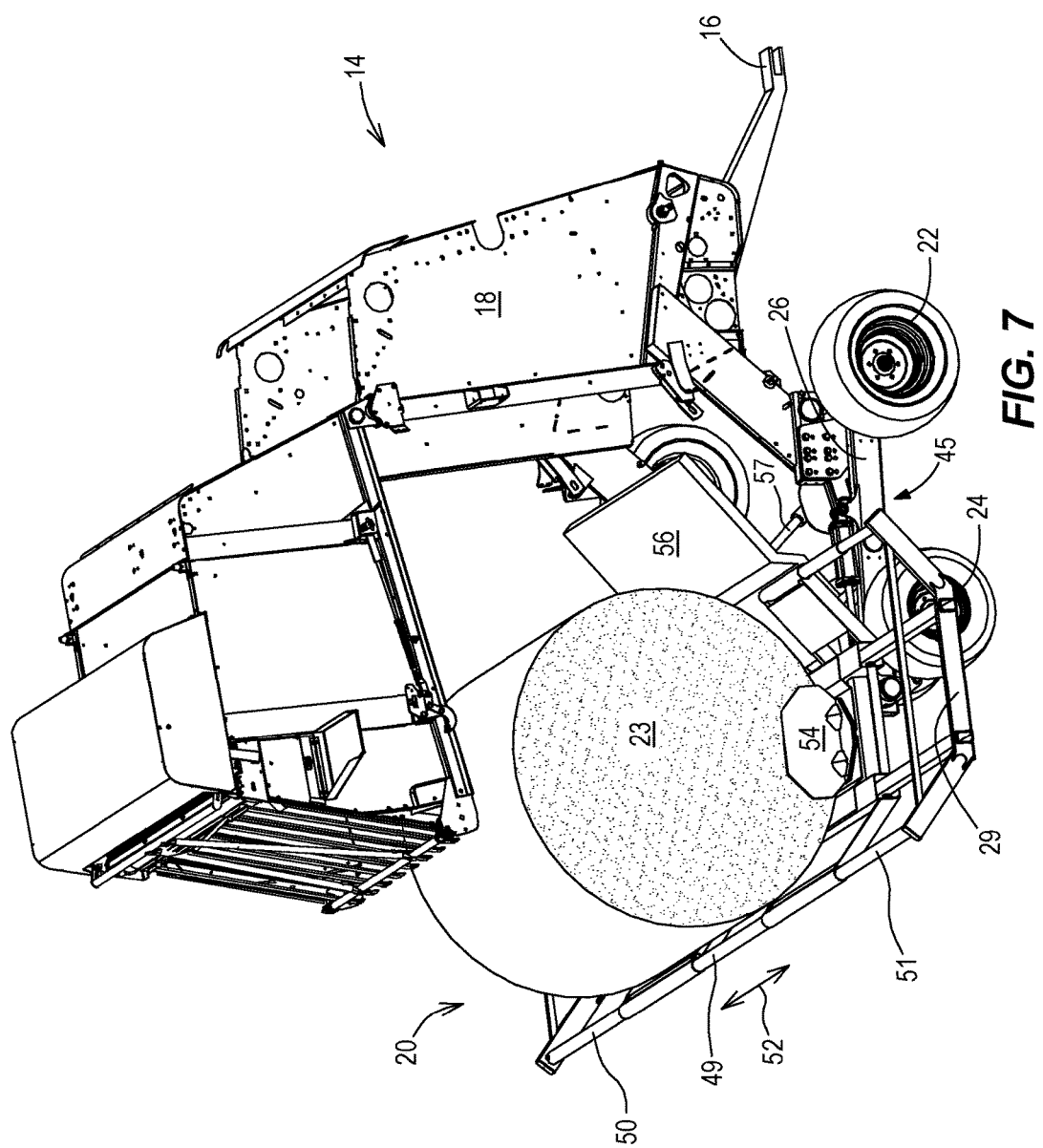
FIG. 7 is another perspective view of the crop harvesting system of FIG. 1 showing a bale being moved.
Figure 8:
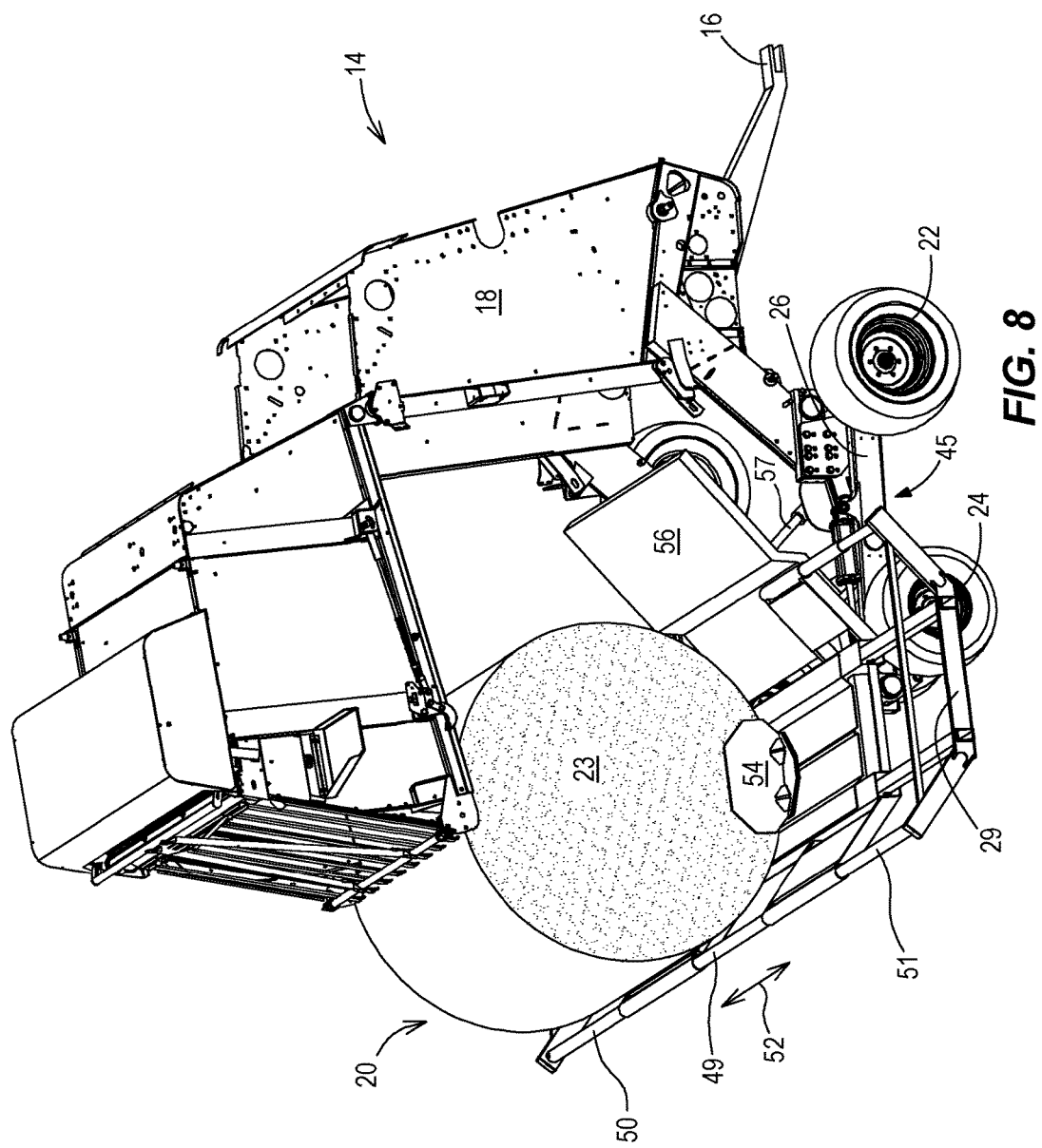
FIG. 8 is another perspective view of the crop harvesting system of FIG. 1 showing a bale being moved further.
Figure 9:
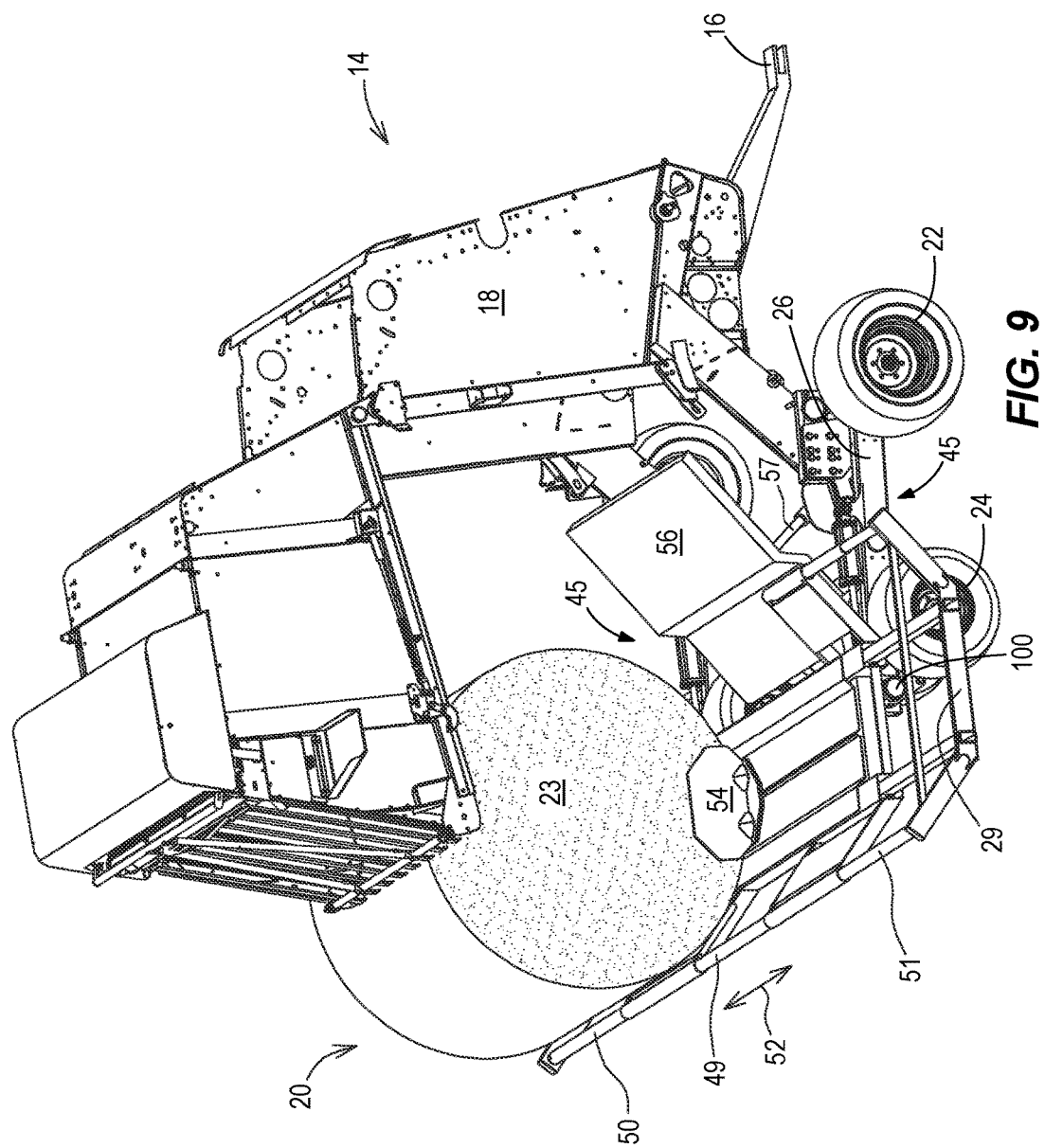
FIG. 9 is another perspective view of the crop harvesting system of FIG. 1 showing a bale being moved completely to the left.

Referring to FIGS. 7-9, there is shown a sequence of positions of the bale 23, as the bale 23 is positioned onto the bale carriage 29 by the platform 56 and moved by the sliding assembly 54. Once the bale 23 is positioned, as shown in FIG. 9 the rear portion of the baler assembly 18 is closed and another bale 23 is produced. When the next bale 23 is produced, the sliding assembly 54 moves the bale 23 onto the extending section 51. When a third bale is produced, the platform 56 moves that bale onto the bale carriage 29.

Figure 10:
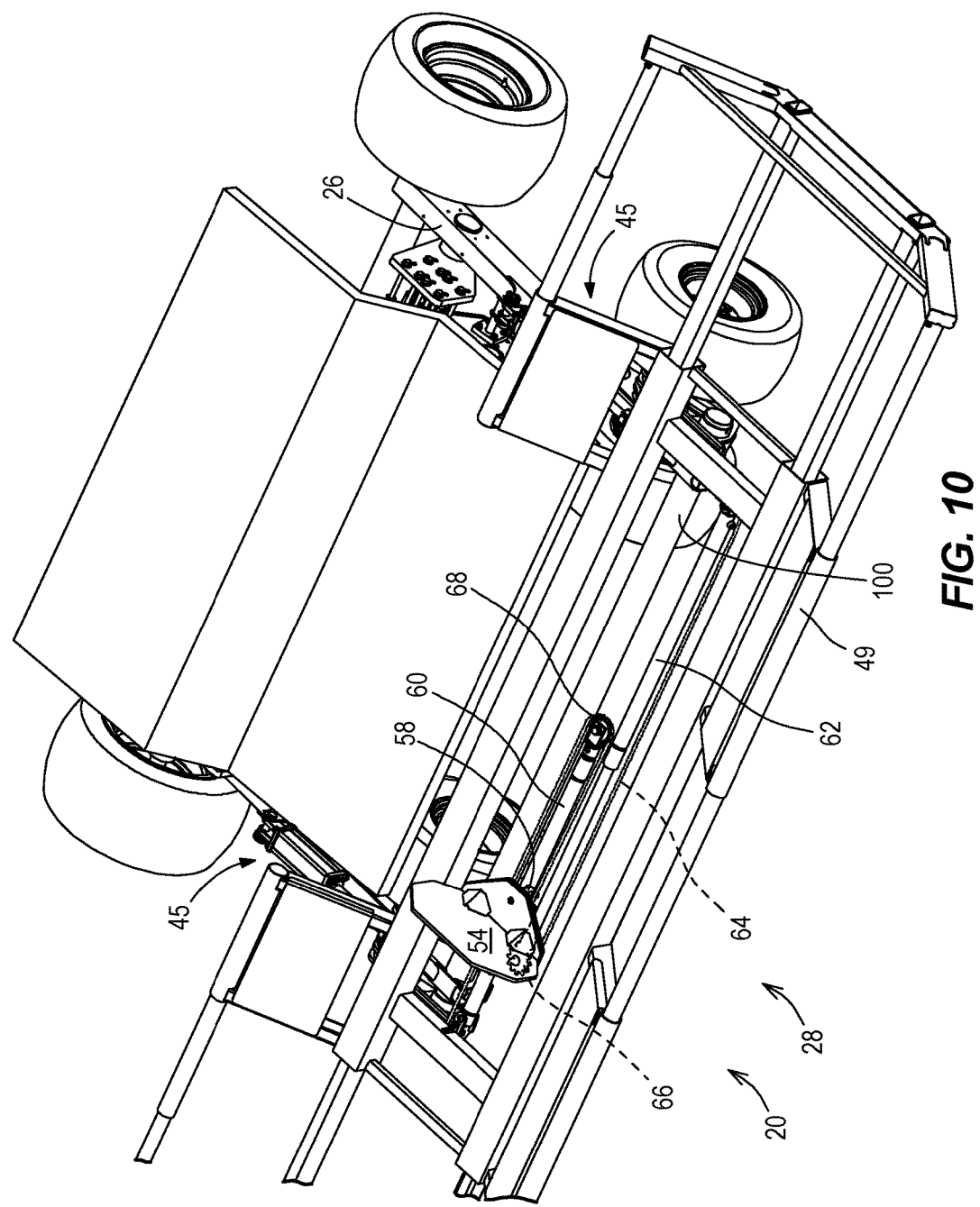
FIG. 10 is a partial perspective view of the accumulator of FIG. 2 including a sliding assembly.
Figure 11:
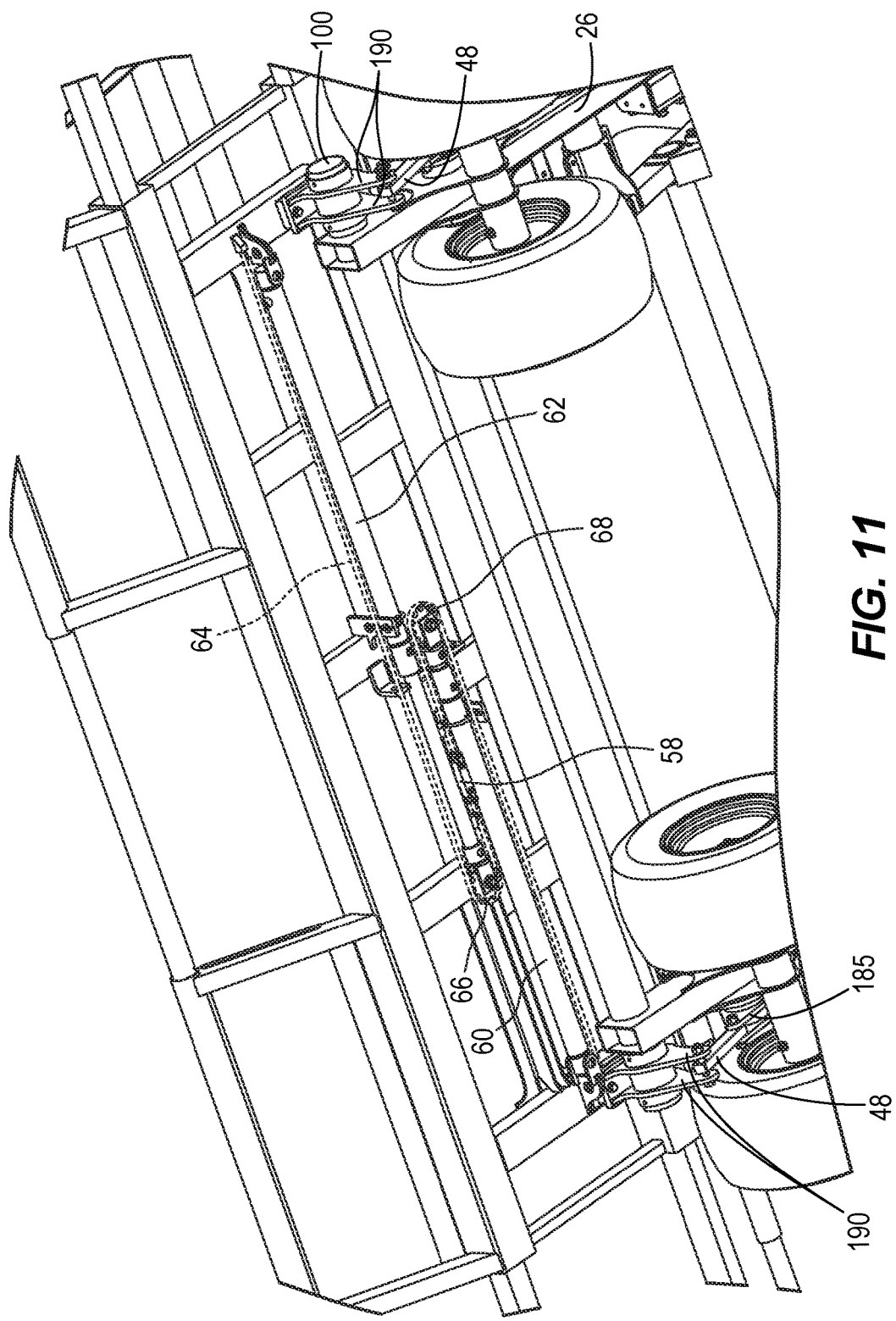
FIG. 11 is a partial perspective view from an underside of the baler of FIG. 10.

With reference to FIGS. 10 and 11, there is shown additional details of the sliding assembly 54 by way of a partially-sectioned perspective view with the floor of the bale carriage 29 removed. The sliding assembly 54 includes a pusher 58, movement devices 60, 62, a flexible link 64, and sprockets 66, 68. The movement devices 60, 62 are actuators and are shown here as hydraulic cylinders. Other movement devices 60, 62 are contemplated by this disclosure (e.g., electronic actuator). The flexible link 64 is shown as a chain, which engages the sprockets 66, 68. Ends of the flexible link 64 may be connected to the cylinder portion of the movement devices 60, 62 or to another portion of the discharge assembly 28. The extension of the rods of the movement devices 60, 62 are coordinated to keep the flexible link 64 from developing undue slack. As the movement devices 60, 62 move at the same rates, the movement of the pusher 58 moves at a higher speed, and more specifically at twice the speed of the movement of the movement devices 60, 62. This advantageously allows movement devices to be generally half of the length (in their retracted position) as the distance traveled by pusher 58.

Referring to FIG. 12, there is shown a system 70 for controlling the speed of harvested crop 23 as it is discharged from the crop accumulator 20. The system 70 comprises a speed measurement device 72 (e.g., speedometer, radar, GPS) for measuring forward travel speed of the crop accumulator 20. The speed measurement device 72 is illustrated as a GPS unit 74 in wired or wireless communication with a processor 76 which, can be connected to a display 78 in the operator station 15 of the tractor 12. The display 78 can include an alarm 79 that alerts an operator when harvested crop 23 is discharged. It is contemplated that the alarm 79 may be audio, visual, vibratory, or other type of alarm. It is also contemplated that the alarm 79 may not be included in the display 78.

The processor 76 is illustrated as an electronic control unit (ECU) or controller 80 and is in communication with the discharge assembly 28 by the over-center linkage system 45 and the speed measurement device 72. The GPS unit 74 can be part of a cell phone or other device. The GPS unit 74 can be configured with at least one virtual trip line 82 that is communicated to the processor 76. Prior to commencing a baling operation an operator will determine the desired location(s) where he/she would like to deposit bales 23 for later recovery and storage. Selection of the deposit location(s) is generally made for the convenience of the operator considering, for example, such factors as the need to reduce soil compaction by reducing traffic on the field, proximity to the storage location, and the topography of the terrain (e.g., the desirability of depositing bales 23 at the top or bottom of a hill rather than on the side of a hill, the desirability of depositing bales 23 at the headlands, along ditches or grass waterways). The number and frequency of deposit locations along a baling path(s) is also limited by the crop yield versus the capacity of the crop accumulator 20. In other words, if a particular field or portion of a field has a higher yield of crop material, more crop will be fed into the baler 14 per unit traveled and thus more bales 23 will be completed over a shorter distance, thereby necessitating the establishment of virtual trip lines 82 that are closer together. Crop yield for a particular field and crop could be determined from historic yield data to generate a predicted crop yield that is stored in a look-up table 84 that is communicated to the ECU 80 or, for example, during the baling operation by monitoring the flow of crop into the baler 14 using appropriate sensors and/or by monitoring the number of bales 23 being produced per unit of distance an actual crop yield could be used. Once the operator has determined the desired deposit location(s) he or she will set in the GPS unit 74 the virtual trip line 82.

With reference to FIGS. 13 and 13A, in order for the bale carriage 29 to discharge a crop package 23 onto the surface 13 adjacent the virtual trip line 82, the actuator 46, which in one embodiment is in communication with the ECU 80, is actuated into the retracted position. Upon actuation of the actuator 46 into the retracted position, the actuator arm 115 retracts so that the block 160 moves towards the first end 135 of the body 120. Via the first connection point 180, the actuator arm 115 also rotates the pivot member 47 in a counterclockwise direction as viewed from FIG. 2A (rotates in the same direction as the second rotational direction 130), which rotates a portion of the linkage member 48 near the second connection point 195 above the action line 215. Once the second connection point 195 moves above the action line 215, the over-center linkage system 45 is in an unlocked condition. In other words, a direction of the axial force 210 is oriented above the action line 215 when the over-center linkage system 45 is in the unlocked condition. In other embodiments, the over-center linkage system 45 may be in the unlocked condition when the actuator 46 is positioned in the extended position. In the illustrated embodiment, with the actuator 46 rotating the pivot member 47 and the linkage member 48 in the same direction as the second rotational direction 130, the third flange 190 and the bale carriage 29 then rotate in the same direction as the first rotational direction 125 for the bale carriage 29 to move into the dumping position (FIGS. 13 and 13A).

Once the bale carriage 29 moves into the dumping position (FIGS. 13 and 13A), the crop packages 23 are allowed to roll off of the bale carriage 29 and onto the surface 13. Moreover, the ECU 80 operates the over-center linkage system 45 via the actuator 46 to control an angular velocity of the bale carriage 29 to be proportional to a first linear velocity of the accumulator 20. In the illustrated embodiment, the ECU 80 controls a flow rate of hydraulic fluid exiting the actuator 46 to control a velocity of the block 160 moving away from the first stop 150, which moves the pivot member 47, the linkage member 48, and the third flange 190, to rotate the bale carriage 29 at a desired angular velocity. In another embodiment, the ECU 80 controls a flow rate of hydraulic fluid entering the actuator 46 to control a velocity of the block 160 moving away from the first stop 150. In yet another embodiment, the angular velocity of the bale carriage 29 may be manually controlled by the operator of the tractor 12 (e.g., the operator manually controls the flow rate of hydraulic fluid exiting or entering the actuator 46 while positioned within the cab 15). The relationship between the angular velocity of the bale carriage 29 and the first linear velocity of the accumulator 20 enables the ECU 80 to discharge the crop package(s) 23 from the accumulator 20 with a second linear velocity that is substantially equal and opposite to the first linear velocity of the accumulator 20. Accordingly, the second linear velocity of the crop package(s) 23 are substantially zero relative to the surface 13 as the crop package(s) 23 contact the surface 13. As a result, the crop package(s) 23 are accurately placed at a desired position on the surface 13 (e.g., on or adjacent the virtual trip line 82) without the crop package(s) 23 rolling out of position.

In another embodiment, the processor 76 is in communication with the discharge assembly 28 and the speed measurement device 72 and is operable to adjust the discharge assembly 28, for imparting the desired rearward travel speed, and the forward travel speed of the crop accumulator 20, to discharge harvested crop 23 with a rearward travel speed that is one of proportional to the forward travel speed and substantially the same as the forward travel speed, such that the harvested crop 23 contacts the ground on the virtual trip line 82, in a zone defined by a predetermined distance from the virtual trip line 82, and outside of a zone defined by a predetermined distance from the virtual trip line 82.

In yet another embodiment, the system 70 alerts an operator via the alarm 79 to adjust at least one of the discharge assembly 28 to impart the rearward travel speed and the forward travel speed of the crop accumulator 20, to discharge harvested crop 23 with a rearward travel speed that is at least one of proportional to the forward travel speed and substantially equal to the forward travel speed, such that the harvested crop 23 has a substantially net zero speed as it contacts the ground.

The illustrated bale carriage 29 can support up to three crop packages 23 at the same time and discharge all of the crop packages 23 onto the surface 13 at the second linear velocity that is substantially equal and opposite to the first linear velocity. The platform 56 may be configured to move in conjunction with the bale carriage 29 as the bale carriage 29 tilts to ensure that the middle bale is also dumped onto the ground with the desired rearward travel speed. The platform 56 may be coupled to the bale carriage 29 about a pivoting connection.

After the crop packages 23 have been discharged from the accumulator 20 and onto the surface 13, the over-center linkage system 45 is actuated back into the locked condition (FIG. 2A) in order to support the subsequent crop packages 23 exiting the baler 14. In general, the over-center linkage system 45 is operable to rotate the bale carriage 29 about the carriage axis 44 and to lock the bale carriage 29 in the locked condition (FIG. 2A). In other embodiments, the over-center linkage system 45 may be operable to only lock the bale carriage 29 in the locked condition with the accumulator 20 including a separate system to move the bale carriage 29 about the carriage axis 44.

Advantageously, the present disclosure can extend extending sections 50, 51 by the action of sliding assembly 54 as bale 23 is pushed onto either section 50 or section 51. This may be an action that occurs on the first use in a field or sections 50 and 51 may be spring loaded causing them to retract each time the bales are dumped from bale carriage 29. It is also contemplated that sections 50 and 51 may be extended manually or by an actuator (not shown). Additionally, the system 70 may sense a sideways tilt of baler 14 causing bale 23 to be moved to the uphill side of baler 14 (if that location is empty) to thereby improve stability.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Various features are set forth in the following claims.

The invention claimed is:

1. An accumulator coupled to an agricultural baler, the accumulator configured to support a crop package exiting the baler, the accumulator comprising:
   an accumulator frame coupled to a wheel supported on a surface;
   a carriage pivotably coupled to the accumulator frame about a first rotational axis for movement in a first rotational direction from a first position to a second position, the carriage configured to support the crop package when the carriage is in the first position, the carriage configured to discharge the crop package from the accumulator when the carriage is in the second position; and
   an over-center linkage system coupled between the accumulator frame and the carriage and including a pivot member configured to rotate in a second rotational direction opposite the first rotational direction to move the carriage in the first rotational direction;
   wherein the over-center linkage system is configured to inhibit rotation of the carriage from the first position to the second position until the over-center linkage system is actuated to move the pivot member in the second rotational direction.

2. The accumulator of claim 1, wherein the over-center linkage system includes an actuator coupled between the accumulator frame and the pivot member, and wherein the over-center linkage system is in a locked condition when the actuator is in a fully extended position.

3. The accumulator of claim 2, wherein the over-center linkage system permits movement of the carriage in the first rotational direction when the actuator is in a retracted position.

4. The accumulator of claim 1, wherein the over-center linkage system includes a linkage member coupled between the pivot member and the carriage, and wherein movement of the carriage is coupled to movement of the pivot member by the linkage member.

5. An accumulator coupled to an agricultural baler, the agricultural baler configured to form a crop package within a formation chamber of the agricultural baler and discharge the formed crop package downstream of the formation chamber, the accumulator comprising:
   an accumulator frame coupled to a wheel supported on a surface;
   a carriage coupled to the accumulator frame for movement between a first position and a second position, the carriage configured to receive and support the formed crop package discharged from the agricultural baler when the carriage is in the first position, the carriage configured to discharge the crop package from the accumulator when the carriage is in the second position; and
   an over-center linkage system coupled between the accumulator frame and the carriage, the over-center linkage system configured to lock the carriage in the first position.

6. The accumulator of claim 5, wherein the carriage is locked in the first position until the over-center linkage system is actuated to move the carriage into the second position.

7. The accumulator of claim 5, wherein the over-center linkage system includes an actuator coupled between the accumulator frame and the carriage, and wherein the actuator is configured to move between a fully extended position and a retracted position.

8. The accumulator of claim 7, wherein the over-center linkage system is rotational concurrently with translation of the actuator.

9. The accumulator of claim 7, wherein the carriage is pivotably coupled to the accumulator frame about a first rotational axis, wherein the over-center linkage system further includes a pivot member coupled between the actuator and the carriage, the pivot member having a second rotational axis parallel to the first rotational axis.

10. The accumulator of claim 9, wherein the actuator inhibits rotation of the pivot member in a first rotational direction when the actuator is in the fully extended position.

11. The accumulator of claim 9, wherein the over-center linkage system further includes a linkage member coupled between the pivot member and the carriage, and wherein movement of the carriage is coupled to movement of the pivot member by the linkage member.

12. An accumulator coupled to an agricultural baler, the accumulator configured to support a crop package exiting the baler, the accumulator comprising:
 an accumulator frame coupled to a wheel supported on a surface;
 a carriage including a platform pivotably coupled to the accumulator frame about a first rotational axis for movement between a first position and a second position, the platform configured to receive and support the crop package discharged from the agricultural baler when the platform is in the first position, the platform configured to discharge the crop package from the accumulator when the platform is in the second position; and
 a linkage system having a second rotational axis, the linkage system including an actuator coupled between the accumulator frame and the second rotational axis and a linkage member coupled between the second rotational axis and the carriage;
 wherein the actuator is operable to move the linkage member about the second rotational axis to move the platform about the first rotational axis.

13. The accumulator of claim 12, wherein the linkage system is an over-center linkage system configured to lock the platform in the first position.

14. The accumulator of claim 13, wherein the over-center linkage system is rotational concurrently with translation of the actuator.

15. The accumulator of claim 13, wherein the over-center linkage system further includes a pivot member coupled to the actuator and the linkage member, the pivot member configured to move about the second rotational axis.

16. The accumulator of claim 15, wherein the actuator is configured to move between a fully extended position and a retracted position, wherein the actuator inhibits rotation of the pivot member in a first rotational direction when the actuator is in the fully extended position.

17. The accumulator of claim 16, wherein the carriage includes a center of gravity, and wherein the first rotational axis is positioned between the center of gravity and the second rotational axis.

18. The accumulator of claim 12, wherein the actuator is a hydraulic cylinder.

19. An accumulator coupled to an agricultural baler and moveable along a surface at a first linear velocity, the agricultural baler configured to form a crop package within a formation chamber of the agricultural baler and discharge the formed crop package downstream of the formation chamber, the accumulator comprising:
 an accumulator frame coupled to a wheel supported on a surface;
 a carriage pivotably coupled to the accumulator frame about a first rotational axis for movement between a first position and a second position, the carriage configured to receive and support the formed crop package discharged from the agricultural baler when the carriage is in the first position, the carriage configured to discharge the crop package from the accumulator when the carriage is in the second position; and
 an over-center linkage system coupled between the accumulator frame and the carriage, the over-center linkage system configured to move the carriage between the first and second positions and to control an angular velocity of the carriage as the carriage moves from the first position to the second position.

20. The accumulator of claim 19, wherein the angular velocity of the carriage is dependent on the first linear velocity of the accumulator.

21. The accumulator of claim 20, wherein the over-center linkage system is also configured to move the carriage at the angular velocity such that the crop package moves relative to the carriage at a second linear velocity that is substantially equal and opposite to the first linear velocity.

22. The accumulator of claim 19, wherein the over-center linkage system includes a hydraulic actuator that is in communication with a controller, and wherein the controller is configured to operate the hydraulic actuator to control the angular velocity of the carriage.

23. The accumulator of claim 19, wherein the carriage is configured to support more than one crop package at the same time.

* * * * *